May 25, 1943.  J. JULIOT  2,320,000
HARROW
Filed Jan. 30, 1942   3 Sheets-Sheet 1
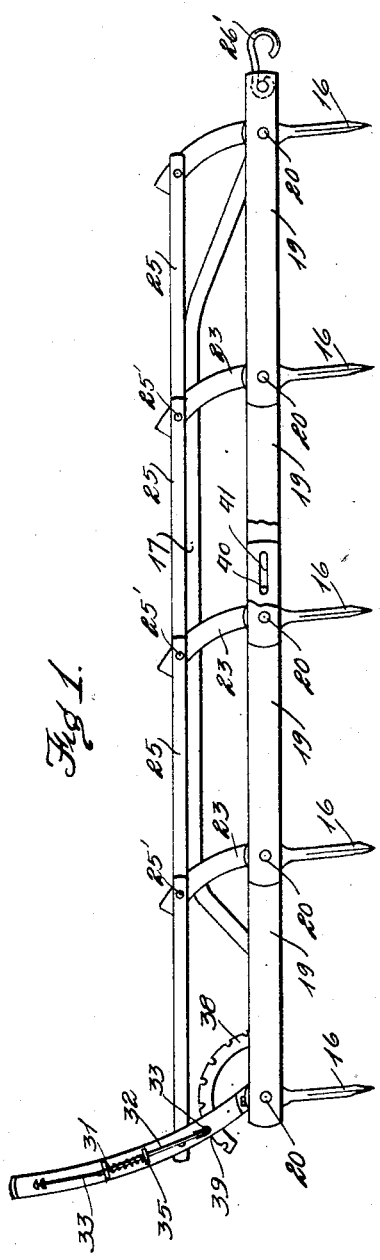
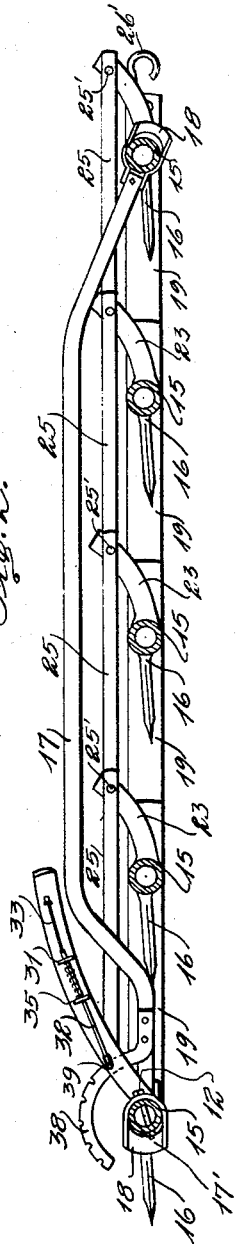
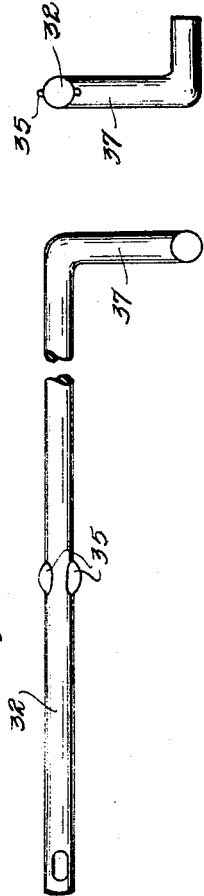
Inventor,
Joseph Juliot,
By Frank S. Appleman,
Attorney.

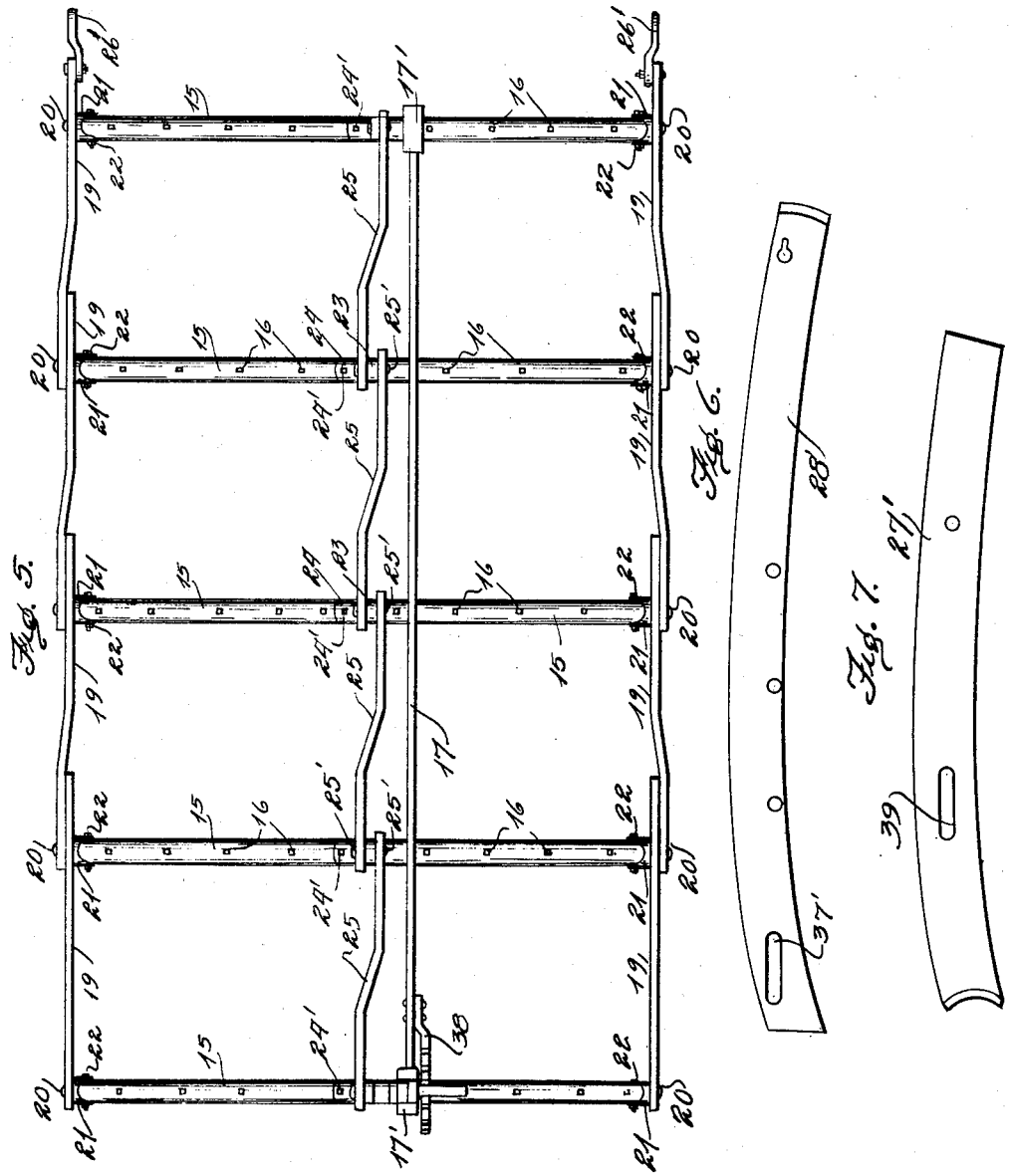

May 25, 1943.  J. JULIOT  2,320,000
HARROW
Filed Jan. 30, 1942   3 Sheets-Sheet 3
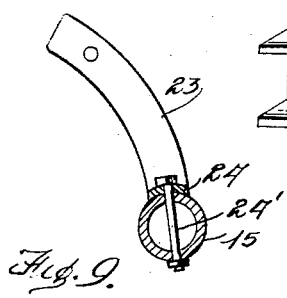
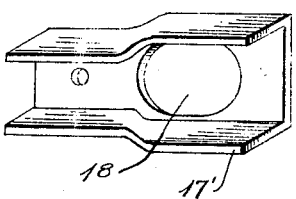
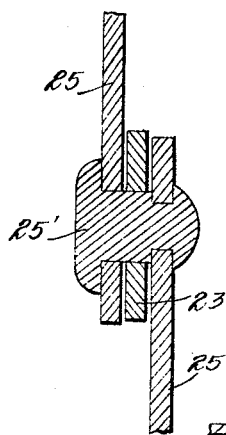
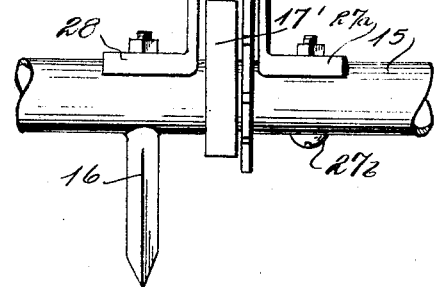
Inventor,
Joseph Juliot,
By Frank L. Appleman
Attorney.

Patented May 25, 1943

2,320,000

UNITED STATES PATENT OFFICE 2,320,000

HARROW

Joseph Juliot, Pepin, Wis., assignor to Northern Wisconsin Manufacturing Co., Pepin, Wis., a corporation of Wisconsin Application January 30, 1942, Serial No. 428,945

7 Claims. (Cl. 55—103)

This invention relates to farming implements and particularly to harrows of the sectional type.

An object of the invention is to provide a harrow having sections, flexible with relation to one another in order that they may adjust themselves to the contour of unlevel ground being harrowed, and to that end the side bars are slotted to allow one tooth bar to rise or fall while the adjacent tooth bar may move oppositely.

A further object of the invention is to provide a harrow having a rigid reach bar and novel joining members that are mounted on the end tubings of tooth bars of the harrow—means being also provided for partially rotating the tubing in the members for adjusting the harrow teeth to assume a backward slant, as the lever is operated.

A further object of the invention is to provide a plurality of links having their ends pivotally mounted on elements rigidly attached to the successive teeth tubes or bars and operative to partially turn said tubes or bars as an end tube or bar is partially turned by a lever or handle.

With the foregoing and other objects which will be stated in describing the details of the harrow, the invention consists in the said details of construction and in the arrangement and combination of parts to be hereinafter more fully set forth and claimed.

In describing the invention in detail, reference will be had to the accompanying drawings forming a part of the application, in which like reference characters refer to like parts in the several views, and in which—

Figure 1 is a view in side elevation of a harrow embodying the invention;

Figure 2 is a longitudinal sectional view of the harrow folded or collapsed;

Figure 3 is a detail view of a pawl for holding an operating lever at different positions of adjustment;

Figure 4 is an end view thereof;

Figure 5 is a plan view of the harrow;

Figure 6 is a view in elevation of one side of the operating lever;

Figure 7 is a side view of another part of said lever;

Figure 8 is a sectional view of one of the bars with a standard in elevation;

Figure 9 shows the details of an assembly, the linked separating bars, a standard and a rivet;

Figure 10 illustrates a sectional view of an assembly comprising overlapping side bars and end clip on a rivet, together with the connection between the clip and a tooth bar;

Figure 11 is a perspective view of a member connecting the reach bar with one of the end tooth bars;

Figure 12 is a sectional view of the pawl;

Figure 13 is a sectional view of the overlapping side bars showing a slot in one of them; and Figure 14 illustrates a view of an assembly comprising the reach bar, a tooth bar to which is mediately connected a lever and parts associated with it for turning the tooth bar, when the parts are in the position shown in Fig. 2.

In these drawings 15—15 denote a plurality of tubular tooth bars having conventional harrow teeth 16. A reach rod 17 extends from the front to the rear of the harrow and couplings 17' on the ends of the reach rod have slots 18 into which the end tooth bars are fitted and in which they partially rotate.

Sectional side bars 19 each extends from one tooth bar to the other and the intermediate side bars overlap at a tooth bar. The overlapped side bars are pivotally connected to the tooth bar and are pivoted on a rivet or stud 20, which rivet or stud also holds a clip 21 which embraces an end of one of the tooth bars, the said clip being secured to its tooth bar by a bolt 22 passing through them.

Between the ends of each tooth bar a standard 23 having a base 24 is secured to said tooth bar by bolts such as 24', and a series of links 25 is successively pivotally connected to the standards of the tooth bars by the use of rivets 25'; hence, when one end tooth bar is partially rotated, as will be presently explained, motion is communicated to the other tooth bars by the links and standards.

Steel draft hooks 26' are pivoted to the forward links 19, one on each side.

The manually operable means for adjusting the tooth bars includes a lever consisting of one side section 27 having a foot or base 28 attached to the rear tooth bar, and another side section 27' having a foot or base 27a attached to the same tooth bar by a bolt 27b. A handle 28' has the section 27 secured to it as at 29, and the section 27' is secured to the handle, as at 30. The section 27' has an angularly disposed upper end 31 through which a pawl 32 reciprocates and a connection 33 is attached to the upper end of the pawl and to a lever 34 pivoted on the handle. The pawl 32 has bosses or shoulders 35 engaged by a compression spring 36, which spring also engages the angular end 31 of the section 27', and the spring 36 acts to force the angular end 31 of the pawl into engagement with the teeth of a segmental rack 38 which is anchored to the reach bar 17. The section 27' has a diagonal slot 39 in which the angular end of the pawl moves, and by which it is guided into engagement with the teeth of the rack. The handle 28' is also provided with a diagonal slot 37' in which the angular end of the pawl is guided so that the pawl is braced by the handle and the section 27' in the slots of which it is movable.

As shown in Fig. 13 the overlapped portions of the side bars have slots and studs, that is, one has a stud 40 fitting in a slot 41 of the other side bar, providing for independent movement of the respective harrow sections.

As seen in Fig. 2, the teeth can be adjusted so that they have a backward slant and assume nearly a horizontal position in line with the side bars 19, in which position the harrow can be skidded or drawn without the teeth interfering with the free movement of the harrow.

I claim:

1. In a collapsible harrow, a plurality of tooth bars successively linked together and having harrow teeth, a reach rod extending from the front to the rear of the harrow with couplings at its ends in which the tooth bars are partially rotatable, a member attached to each tooth bar, and means for oscillating said members whereby the tooth bars are partially rotated, said means comprising a handle attached to one of the bars whereby its partial rotation communicates motion to the successive tooth bars.

2. In a collapsible harrow, a plurality of tooth bars successively linked together and having harrow teeth, a reach rod extending from the front to the rear of the harrow with couplings at its ends in which the tooth bars are partially rotatable, a member attached to each tooth bar, means for oscillating said members whereby the tooth bars are partially rotated, said means comprising a handle attached to one of the bars whereby its partial rotation communicates motion to the successive tooth bars, and means for holding the handle in different positions of adjustment including a segmental rack and a detent carried by the handle engaging said rack.

3. In a collapsible harrow, a plurality of tooth bars successively arranged transversely of the harrow structure and having harrow teeth, a reach rod extending from the front to the rear tooth bar, means for linking the tooth bars successively together, a coupling on each end of the reach rod having a slot to receive a tooth bar with which it is associated and means for partially rotating the said tooth bars in said slots.

4. In a collapsible harrow, tooth bars in spaced relation to one another longitudinally of the harrow, said tooth bars having harrow teeth, links at each end of the tooth bar, the said links extending from one bar to another successively, the links between the tooth bars overlapping and having slot and stud connections for permitting the sections of the harrow to move independently of one another, a standard attached to each tooth bar, links each extending from one tooth bar to another and pivotally connected to the standards, a reach bar extending from the front to the rear tooth bar and pivotally connected to the said tooth bars, and means for partially rotating one of the tooth bars whereby motion is communicated to the other tooth bars through the standards and second mentioned links.

5. In a collapsible harrow, tooth bars in spaced relation to one another longitudinally of the harrow, said tooth bars having harrow teeth, links at each end of the tooth bar, the said links extending from one bar to another successively, the links between the tooth bars overlapping and having slot and stud connections for permitting the sections of the harrow to move independently of one another, a standard attached to each tooth bar, links each extending from one tooth bar to another and pivotally connected to the standards, a reach bar extending from the front to the rear tooth bar and pivotally connected to the said tooth bars, a handle operative to partially rotate the tooth bars whereby motion is communicated to the tooth bars through the standards and second mentioned links, said handle comprising a member attached to the end tooth bar and having a slot approximately longitudinally thereof, an operating element attached to said member and extending parallel to and in spaced relation with the member, the said element having a slot corresponding to the slot in the member, a spring-pressed pawl having an end movable in the said slots, means for moving the pawl against the action of the spring, and a stationary toothed segment with relation to which the pawl coacts to hold the handle in adjusted positions.

6. In a collapsible harrow, a plurality of tooth bars successively linked together and having harrow teeth, a reach rod extending from the front to the rear of the harrow with couplings at its ends in which the tooth bars are partially rotatable, a member attached to each tooth bar, and means for oscillating said members whereby the tooth bars are partially rotated to carry the teeth to a rearward slant, the arrangement being such that the teeth are parallel with side bars of the harrow, in which position the harrow may be supported by the side bars when being moved.

7. In a collapsible harrow, a plurality of tooth bars successively linked together and having harrow teeth, a reach rod extending from the front to the rear of the harrow with couplings at its ends in which the tooth bars are partially rotatable, a member attached to each tooth bar, and means for oscillating said members whereby the tooth bars are partially rotated to carry the teeth to a rearward slant, the arrangement being such that the teeth are parallel with side bars of the harrow, in which position the harrow may be supported by the side bars when being moved, the means for oscillating the members comprising a handle attached to one of the bars and movable to overlie the harrow when the teeth are backwardly inclined.

JOSEPH JULIOT.